United States Patent
Park et al.

(10) Patent No.: US 10,931,711 B2
(45) Date of Patent: Feb. 23, 2021

(54) SYSTEM OF DEFENDING AGAINST HTTP DDOS ATTACK BASED ON SDN AND METHOD THEREOF

(71) Applicant: KOREA UNIVERSITY RESEARCH AND BUSINESS FOUNDATION, Seoul (KR)

(72) Inventors: Jinwoo Park, Seoul (KR); Ki-won Hong, Seoul (KR)

(73) Assignee: KOREA UNIVERSITY RESEARCH AND BUSINESS FOUNDATION, Seoul (KR)

(*) Notice: Subject to any disclaimer, the term of this patent is extended or adjusted under 35 U.S.C. 154(b) by 153 days.

(21) Appl. No.: 16/185,662

(22) Filed: Nov. 9, 2018

(65) Prior Publication Data

US 2019/0149573 A1  May 16, 2019

(30) Foreign Application Priority Data

Nov. 10, 2017  (KR) .......................... 10-2017-0149532

(51) Int. Cl.
*H04L 29/06* (2006.01)
*H04L 12/24* (2006.01)
*H04L 29/08* (2006.01)

(52) U.S. Cl.
CPC .......... *H04L 63/1458* (2013.01); *H04L 41/00* (2013.01); *H04L 63/1416* (2013.01); *H04L 63/168* (2013.01); *H04L 67/02* (2013.01); *H04L 2463/141* (2013.01)

(58) Field of Classification Search
CPC combination set(s) only.
See application file for complete search history.

(56) References Cited

U.S. PATENT DOCUMENTS

2016/0036837 A1* 2/2016 Jain .................... H04L 63/1416
                                                                  726/23
2018/0234454 A1* 8/2018 Aggarwal .......... H04L 63/1425

FOREIGN PATENT DOCUMENTS

| KR | 10-0973076 B1 | 7/2010 |
| KR | 10-2011-0048349 A | 5/2011 |
| KR | 10-2017-0109949 A | 10/2017 |

OTHER PUBLICATIONS

Korean Office Action dated Mar. 20, 2019, in connection with the Korean Patent Application No. 10-2017-0149532 citing the above reference(s).

* cited by examiner

*Primary Examiner* — Jason K Gee
(74) *Attorney, Agent, or Firm* — Hauptman Ham, LLP

(57) ABSTRACT

Disclosed are a system of defending against a DDoS attack based on an SDN and a method thereof. According to the present invention, when the HTTP Request message suspected for the attack arrives at the web server, the web server sends the HTTP Request message to the SDN controller located in the network, and the SDN controller determines the DDoS attack instead of the web server which is the attack target and blocks the traffic from the attacker through the nodes on the network according to the determination result of the SDN controller. Thereby, the traffic suspected as the DDoS attack that exhausts available connection resources of the web server is input to the SDN controller instead of the web server. Thereby the web server can be protected from the DDoS attack and the maintenance of the normal operation of the web server can be secured.

7 Claims, 3 Drawing Sheets

SYSTEM OF DEFENDING AGAINST HTTP DDOS ATTACK BASED ON SDN AND METHOD THEREOF

CROSS-REFERENCE TO RELATED APPLICATIONS

This application is based upon and claims the benefit of priority to Korean Patent Application No. 10-2017-0149532 filed on Nov. 10, 2017, with the Korean Intellectual Property Office, the disclosure of which is incorporated herein by reference.

BACKGROUND OF THE INVENTION

Field of the Invention

The present invention relates to a system of defending a web server against HTTP DDoS attack based on an SDN and a method thereof, and more particularly, to a system of defending against a DDoS attack based on an SDN and a method thereof, in which when HTTP Request messages suspected for an attack arrives to a web server, the web server sends the HTTP Request messages suspected for the attack to an SDN controller located in a network, and the SDN controller determines whether the HTTP Request messages are for DDoS attack instead of the web server which is an attack target and blocks traffic from an attacker through a node (alternatively, routers) on the network according to the determination result.

Description of the Related Art

A distributed denial of service (DDoS) attack is an attack in which an attacker uses many zombie PCs infected with malicious codes to transmit a huge amount of traffic that can overload an attacked target system or can occupy a large amount of connection resources to deteriorate performance of the target system, thereby hindering normal Internet services.

In the past, the HTTP DDoS attacks on the network/transmission layer, such as TCP/UDP/ICMP flooding attacks, which generate large or fast packets, have been dominant.

Because these attacks have abnormal traffic patterns in terms of volume and speed compared to traffic patterns generated by normal clients, various network-based DDoS defending methods that detect DDoS attacks by analyzing traffic patterns input to network devices such as switches and routers and block the detected attacks have been developed and applied.

However, in recent times, as attack traffic which has the similar traffic patterns generated by normal clients has been greatly increasing, the application layer DDoS attacks become very hard to detect accurately and make the pre-existing network-based DDoS protection techniques ineffective.

Typical examples of application layer HTTP DDoS attacks are a Slowloris attack and a Slow HTTP POST DDoS attack as a form of Slow HTTP DDoS attack that abuses HTTP vulnerabilities and exhausts the available connection resources of the web server. The slow HTTP DDoS attack abuses the HTTP vulnerability in which a web server that receives an incomplete HTTP Request message by transmitting the incomplete HTTP Request message needs to maintain a connection until the HTTP Request message is completed. In this attack, the attacker transmits an incomplete HTTP Request message to the web server after establishing a normal TCP connection through a TCP 3-way handshaking with the web server as an attack target. The web server receiving the incomplete HTTP Request message maintains the connection until an HTTP Request message continuously transmitted the received incomplete HTTP Request message is completed. However, the attacker maintains the connection established with the web server for a long time by transmitting the incomplete HTTP Request message which is transmitted continuously. If the attacker transmits a large number of incomplete HTTP Request messages and occupies most of the connection and the information processing resources of the attack target web server, the quality of services that the corresponding web server is degraded.

Slowloris Attacks and Slow HTTP POST DDoS attacks are classified according to the type of incomplete HTTP Request message transmitted by the attacker. In the Slowloris attack, the attacker transmits an HTTP GET Request message including an incomplete HTTP header. In the HTTP message, a header and a body are divided by a new-line character '', and in the Slowloris attack, the attacker abnormally manipulates the HTTP message to continuously transmit an HTTP GET Request message with an HTTP header without the new-line character to the web server. The web server receiving the HTTP GET Request message waits while maintaining the connection until receiving a complete HTTP header terminated with ''. The attacker transmits the HTTP message with the incomplete HTTP header to the web server at regular intervals to keep the connection of the web server for a long time. As a result, the web server occupies the available connection resources and the web server is in a state which cannot provide the connection to the client.

The Slow POST DDoS attack allows an attacker to manipulate abnormally an HTTP POST Request message and transmit a large amount of data to be transmitted to the web server over a long period of time. A Contents-Length field in the header of the HTTP POST Request message defines a size of the data included in the body of the HTTP POST Request message, and the web server maintains the connection until receiving all the data corresponding to the Contents-Length field value of the received HTTP POST Request message. By abusing this point, the attacker sets the Contents-Length field value in the HTTP POST Request message to a very large value and transmits only the very small data included in the actually transmitted HTTP message to maintain the web server from terminating the connection for receiving the corresponding data. If the attacker occupies many connections to reach the maximum number of connections of the web server, the web server will not be able to provide the connection to the normal client, resulting in a service failure.

Currently, in order to defend against the HTTP DDoS attacks, it has been tried to prevent the attacker from occupying the available connection resources of the web server by setting up the web server to restrict the maximum number of concurrent connections per specific transmission IP address. However, if the attacker exploits multiple zombie PCs, and each zombie PC maintains connections below the maximum number of concurrent connections allowed by the web server, the attacker can occupy most of the connections to the web server. Therefore, an effective defending result against the HTTP DDoS attack can not be expected by the method.

In addition, the web server can set a timer for receiving the HTTP Request messages to defend against the HTTP DDoS attacks. For example, when the HTTP Request message from the client is not completed within a specified time through a RequestReadTimeout indicator of a mod_reqtimeout module of the Apache web server, it is possible for the web server to determine that the HTTP Request messages are for the DDoS attack. However, the DDoS attack can be confirmed only after the timer set by the web server expires, so that the available connections of the web server are occupied by the attacker until the web server recognizes the attack. In the meantime, the web server can no longer accept an HTTP request from the normal client resulting into degradation of the quality of service.

So far, a defense against the HTTP DDoS attack have depend on a server-side defense mechanism to detect and defend against the attack in the web server through appropriate settings of web server functions. However, the DDoS defense mechanism that operates at the server side can't detect and block the attack traffic before deteriorating the performance of the web server. In addition, the network resources used for connection from the attack source to the attack target system are wasted.

A preferred HTTP DDoS defense mechanism is a network-based DDoS defense mechanism that detects DDoS attacks in network device such as a traffic switch or network router where the DDoS attack traffic is identified and blocked at an intermediate paths of the network not to reach the web server. However, the HTTP DDoS attack messages are hard to be discriminated at the network devices such as switches or routers because the HTTP DDoS attack traffic is quite similar to the traffic from normal client in terms of traffic size, pattern, and speed.

SUMMARY OF THE INVENTION

An object of the present invention is to provide a system of defending a web server against HTTP DDoS attack based on an SDN and a method thereof, in which when HTTP Request messages suspected for attack arrive at the web server, the web server sends the HTTP Request messages suspected for the attack to an SDN controller located in a network. The SDN controller determines whether the HTTP Request messages are for DDoS attack instead of the web server which is an attack target. When the HTTP Request messages are determined as attack traffic by the SDN controller, the SDN controller manipulates network nodes (alternatively, routers) to block the attack traffic so that the attack traffic does not reach the target web server.

Another object of the present invention is to provide a system of protecting a web server's normal operation against DDoS attacks based on an SDN and a method thereof. Right after the SDN controller receives the suspected HTTP Request messages from the web server, the SDN controller transmits the traffic path change request message to the SDN nodes in a network to receive the HTTP Request messages subsequently transmitted from the suspicious client unit instead of the web server. With the result of the SDN controller's determination of whether the corresponding HTTP Request messages are for DDoS attack or normal web services, the SDN controller transmits the traffic path change request message to the SDN nodes to block the following traffic belonging to the corresponding HTTP Request message or restore the traffic paths for normal web services.

An exemplary embodiment of the present invention provides a method of defending against a DDoS attack based on an SDN, the method including: sending, by a web server, an HTTP Request message to an SDN controller when the HTTP Request message transmitted from a client unit is determined as an incomplete HTTP Request message suspected for an attack; transmitting, by the SDN controller, to one or more SDN nodes a first traffic path change request message including information for changing from the web server to the SDN controller a destination of an HTTP message continuously subsequent to the HTTP Request message transmitted from the client unit to the web server as the destination; determining, by the SDN controller, if the incomplete HTTP Request message transmitted from the client unit is for the attack; transmitting, by the SDN controller, to the one or more SDN nodes a third traffic path change request message to request to discard at the one or more SDN nodes messages transmitted from the client unit as an attacker to the web server as the destination, when the HTTP Request message is confirmed as the HTTP Request targeting the attack as the confirmation result; and discarding, by the one or more SDN nodes, the HTTP Request message and the HTTP message continuously subsequent to the HTTP Request message transmitted from the client unit to the web server as the destination based on the third traffic path change request message.

The method may further include transmitting, by the SDN controller, to the one or more SDN nodes a second traffic path change request message including information for changing from the SDN controller to the web server a destination of the HTTP message continuously subsequent to the HTTP Request message transmitted from the client unit, in order to restore an information transmission path between the client unit and the web server, when the incomplete HTTP Request message suspected for the attack is confirmed as a normal HTTP Request message; forwarding, by the one or more SDN nodes, to the web server the HTTP message continuously subsequent to the HTTP Request message transmitted from the client unit to the web server as the destination based on the second traffic path change request message; and receiving, by the web server, the HTTP message continuously subsequent to the HTTP Request message transmitted from the client unit.

The third traffic path change request message may include at least one of source IP information, destination IP information, source port information, and destination port information of the client unit as the attacker.

Another exemplary embodiment of the present invention provides a system of defending against a DDoS attack based on an SDN, the system including: an SDN network; a client unit that transmits an HTTP Request message to a web server as a destination through the SDN network; the web server that sends the HTTP Request message to an SDN controller when the HTTP Request message transmitted from the client unit is determined as an incomplete HTTP Request message suspected for an attack; the SDN controller that transmits to one or more SDN nodes a first traffic path change request message including information for changing from the web server to the SDN controller a destination of an HTTP message continuously subsequent to the HTTP Request message transmitted from the client unit to the web server as the destination, and transmits to the one or more SDN nodes a third traffic path change request message to discard messages transmitted from the client unit as an attacker to the web server as the destination, when the incomplete HTTP Request message suspected for the attack is confirmed as targeting the attack; and the one or more SDN nodes that discard or block the HTTP Request message and the HTTP message continuously subsequent to the HTTP Request message transmitted from the client unit to the web server as the destination based on the third traffic path change request message.

The web server may halt all tasks requested by the client unit or terminate the connection with the client unit, after sending to the SDN controller the incomplete HTTP Request message suspected for the attack transmitted from the client unit.

The one or more SDN nodes may send to the SDN controller the HTTP Request message and the HTTP message continuously subsequent to the HTTP Request message transmitted from the client unit to the web server as the destination based on the first traffic path change request message, and the SDN controller may receive the HTTP Request message and the HTTP message continuously subsequent to the HTTP Request message transmitted from the client unit and transmit an HTTP response message to the HTTP Request message and the HTTP message continuously subsequent to the received HTTP Request message to the client unit.

The SDN controller may transmit to the one or more SDN nodes a second traffic path change request message including information for changing from the SDN controller to the web server a destination of the HTTP message continuously subsequent to the HTTP Request message transmitted from the client unit, in order to restore an information transmission path between the client unit and the web server, when the incomplete HTTP Request message suspected for the attack is confirmed as a normal HTTP Request message.

The one or more SDN nodes may forward to the web server the HTTP Request message and the HTTP message continuously subsequent to the HTTP Request message transmitted from the client unit to the web server as the destination based on the second traffic path change request message, and the web server may receive the HTTP Request message and the HTTP message continuously subsequent to the HTTP Request message transmitted from the client unit through the restored path and transmit an HTTP response message to the HTTP Request message and the HTTP message continuously subsequent to the received HTTP Request message to the client unit.

According to the present invention, when the HTTP Request message suspected for the attack arrives at the web server, the web server transmits the HTTP Request message suspected for the attack to the SDN controller located in the network, and the SDN controller determines if the HTTP Request message is for the DDoS attack instead of the web server which is the attack target and blocks the traffic from the attacker through the node (alternatively, router) on the network. Further, the traffic suspected as the DDoS attack that exhausts available connection resources of the web server is input to the SDN controller instead of the web server, thereby protecting the web server from the DDoS attack and securing the maintenance of the normal operation of the web server.

Further, when the HTTP Request message suspected for the attack arrives to the web server, immediately after the SDN controller receives the HTTP Request message from the web server, the SDN controller transmits the traffic path change request messages to the SDN nodes to receive the HTTP message subsequently transmitted from the client unit instead of the web server and restores the traffic path or blocks the corresponding traffic through the SDN nodes according to the result of determination if the corresponding HTTP Request message is for the DDoS attack so that the traffic from the detected DDoS attacker is blocked before arriving at the web server, thereby preventing the connection of the traffic connected to the web server and the waste of an occupied bandwidth in the network path.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
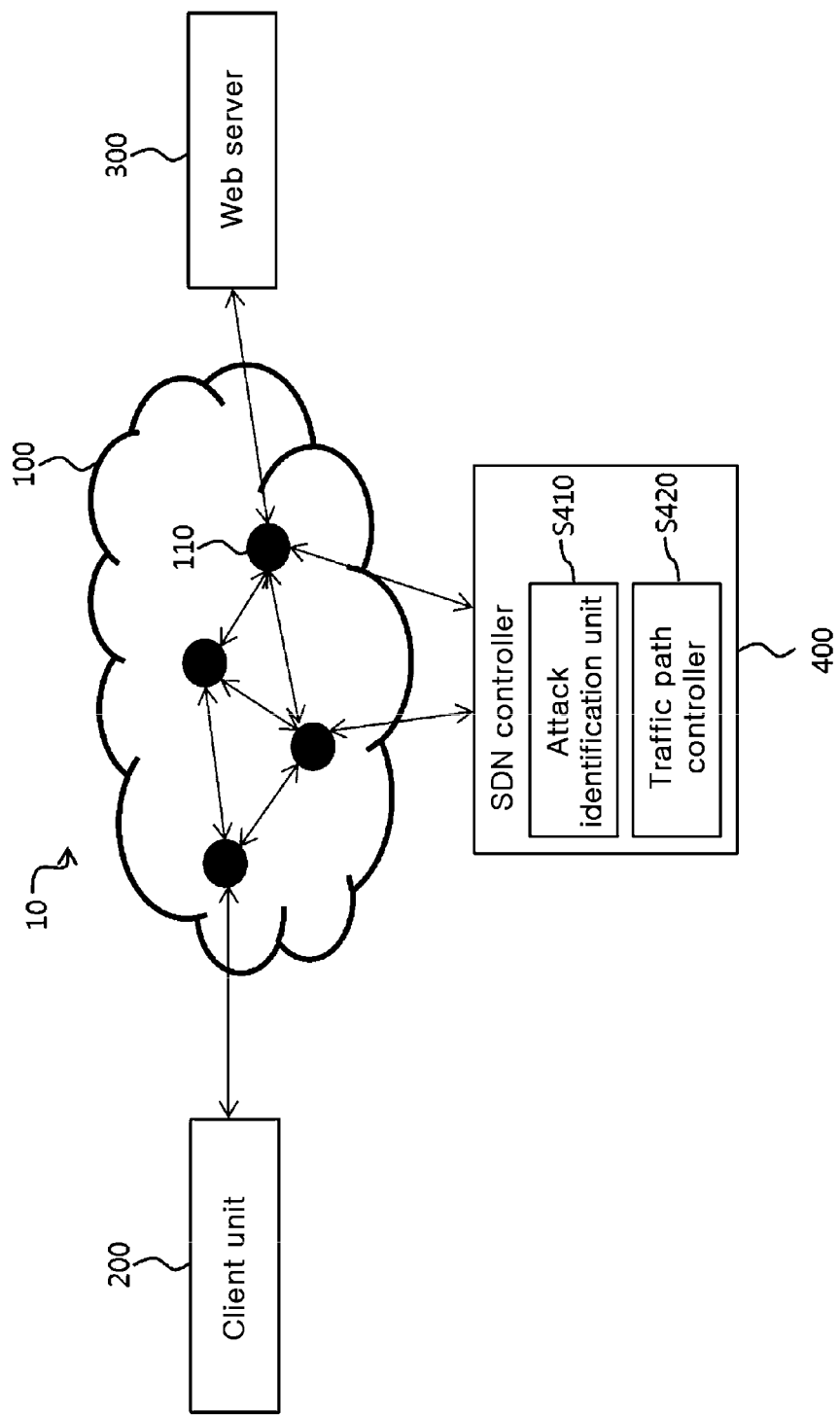
FIG. 1 is a block diagram illustrating a configuration of a system of defending against a DDoS attack based on an SDN according to an exemplary embodiment of the present invention.

Technical terms used in the present invention are used only to describe specific embodiments, and are not intended to limit the present invention. Further, unless otherwise defined in the present invention, the technical terms used in the present invention should be interpreted as meanings generally appreciated by those skilled in the art and should not be interpreted as excessively comprehensive meanings or excessively reduced meanings. Further, when the technical term used in the present invention is a wrong technical term that does not accurately express the spirit of the present invention, the technical term should be understood by being substituted by a technical term which can be correctly understood by those skilled in the art. In addition, a general term used in the present invention should be interpreted as defined in a dictionary or contextually, and should not be interpreted as an excessively reduced meaning.

Further, singular expressions used in the present invention include plural expressions unless they have definitely opposite meanings in the context. In the present invention, a term such as "comprising" or "including" should not be interpreted as necessarily including all various components or various steps disclosed in the invention, and it should be interpreted that some component or some steps among them may not be included or additional components or steps may be further included.

Further, terms including an ordinary number, such as first and second, and the like are used for describing various components, but the components are not limited by the terms. The above terms are used only to discriminate one component from the other components. For example, a first component may be referred to as a second component, and similarly, the second component may be referred to as the first component without departing from the scope of the present invention.

Hereinafter, preferred embodiments of the present invention will be described in detail with reference to the accompanying drawings, in which like reference numerals refer to like or similar elements regardless of reference numerals and a duplicated description thereof will be omitted.

Further, in the following description, a detailed explanation of known associated technologies may be omitted to avoid unnecessarily obscuring the subject matter of the present invention. Further, it is noted that the accompanying drawings are only for easily understanding the spirit of the present invention and it should not be interpreted that the spirit of the present invention is limited by the accompanying drawings.

FIG. 1 is a block diagram illustrating a configuration of a system 10 of defending against a DDoS attack based on an SDN according to an exemplary embodiment of the present invention.

As illustrated in FIG. 1, the system 10 of defending against the DDoS attack based on the SDN is configured by an SDN network 100, a client unit 200, a web server 300, and an SDN controller 400. All the components of the defending system 10 illustrated in FIG. 1 are not required components, and the defending system 10 may be implemented by more components than the components illustrated in FIG. 1 or may also be implemented by less components therethan.

The SDN network 100 is configured by a plurality of SDN nodes 110 performing a plurality of software defined networking (SDN) functions.

The SDN nodes 110 are routing systems which constitute (alternatively, forms) information transmission path between the client unit 200 including DDoS attackers and the web server 300. The systems are able to discard the incoming packets based on the decision made by the SDN controller.

In the exemplary embodiment of the present invention, the SDN network 100 is mainly described, but the present invention is not limited thereto, and in addition to the SDN network 100, the client unit 200 including DDoS attackers, the web server 300, and the SDN controller 400 may be connected to each other through various types of communication networks (alternatively, networks).

Further, the plurality of SDN nodes 110 forwards an HTTP Request message transmitted from the client unit 200 to the web server 300 corresponding to a destination.

Further, the plurality of SDN nodes 110 forwards HTTP response messages to the HTTP Request messages transmitted from the web server 300 to the client unit 200 in response to the HTTP Request messages.

In addition, the plurality (alternatively, one or more) of SDN nodes 110 receives a first traffic path change request message transmitted from the SDN controller 400, respectively. Herein, the first traffic path change request message includes information for changing from the web server 300 to the SDN controller 400 a destination of an HTTP message continuously subsequent to the HTTP Request message transmitted from the client unit 200 including DDoS attackers to the web server 300 as the destination (for example, including destination IP information related with the SDN controller 400, destination port information related with the SDN controller 400, and the like) (alternatively, information for changing a traffic routing rule of the SDN node 110).

Further, the SDN node 110 transfers (alternatively, transmits) to the SDN controller 400 an HTTP message (alternatively, an HTTP Continuation message) continuously subsequent to the HTTP Request message transmitted from the client unit 200 to the web server 300 as the destination based on the received first traffic path change request message.

The HTTP Request message described in the present invention indicates a message transmitted from the client unit 200 to the web server 300 as the destination (alternatively, a receiving unit). In this case, when the HTTP Request message is separated (alternatively, divided) into a plurality of messages and the plurality of separated HTTP Request messages are continuously subsequent to be transmitted to the web server 300 as the destination, the continuously transmitted HTTP Request messages are indicated as the HTTP Continuation message. Further, when the HTTP Request message is divided into the plurality of messages, if the HTTP message at the last part arrives at the receiving unit (alternatively, the destination), the corresponding HTTP Request message may be completed as one message. Here, a partial HTTP Request message transmitted until the HTTP request message is completed in the receiving unit is referred to as an incomplete message.

Further, the plurality (alternatively, one or more) of SDN nodes 110 responds to the HTTP message continuously subsequent to the HTTP request message transmitted to the SDN controller 400 according to the first traffic path change request message to transmit an HTTP response message for the HTTP message continuously subsequent to the HTTP request message transmitted from the SDN controller 400 to the client unit 200.

In addition, the plurality (alternatively, one or more) of SDN nodes 110 receives a second traffic path change request message transmitted from the SDN controller 400, respectively. Herein, the second traffic path change request message includes information for changing from the SDN controller 400 to the web server 300 a destination of the HTTP message continuously subsequent to the HTTP request message transmitted from the client unit 200 so that an information transmission path between the client unit 200 and the web server 300 is restored to perform a normal web service.

Further, the SDN node 110 transfers (alternatively, transmits) to the web server 300 instead of the SDN controller 400 an HTTP message (alternatively, an HTTP Continuation message) continuously subsequent to the HTTP Request message transmitted from the client unit 200 to the web server 300 as the destination based on the received second traffic path change request message.

Further, the plurality (alternatively, one or more) of SDN nodes 110 responds to the HTTP message continuously subsequent to the HTTP request message transmitted to the web server 300 according to the second traffic path change request message to transmit an HTTP response message for the HTTP message continuously subsequent to the HTTP request message transmitted from the web server 300 to the client unit 200.

In addition, the plurality (alternatively, one or more) of SDN nodes 110 receives a third traffic path change request message transmitted from the SDN controller 400, respectively. Herein, the third traffic path change request message includes source IP information, destination IP information, source port information, destination port information, and the like of the client unit 200 which is an attacker for discarding a message (alternatively, a packet) transmitted from the client unit 200 as the attacker to the web server 300 as the destination.

Further, the SDN node 110 does not transmit to the SDN controller 400 and the web server 300 an HTTP message (alternatively, an HTTP request message for attack/HTTP request message for attack/Slow HTTP Request message for attack) continuously subsequent to the HTTP Request message transmitted from the client unit 200 to the web server 300 as the destination based on the received third traffic path change request message, but discards (alternatively, deletes/returns) the HTTP message.

The client unit 200 transmits information (alternatively, a message/packet) to the web server 300 corresponding to the destination through the SDN network 100. At this time, the client unit 200 may be a terminal transmitting a normal message or a terminal (alternatively, an attacker) performing a DDoS attack.

Further, the client unit 200, the web server 300 and the SDN controller 400 are connected to each other by a TCP 3-way handshaking method or the like to perform procedures for requesting, accepting, and providing services.

Also, the client unit 200 transmits an HTTP Request message (alternatively, a Slow HTTP Request message/packet) to the web server 300 to the web server 300 as the destination.

Further, the client unit 200 receives a response message (alternatively, an HTTP response message) to the HTTP Request message transmitted from the web server 300 in response to the transmitted HTTP Request message.

Further, when the HTTP request message is transmitted to the SDN controller 400, the client unit 200 receives the HTTP response message transmitted from the SDN controller 400 in response to the transmitted HTTP request message to maintain an Internet connection.

Also, the client unit 200 continuously transmits an HTTP message to the web server 300 until the HTTP Request message corresponding to the web server 300 as the destination is completed.

In addition, the client unit 200 receives an HTTP response message transmitted from the web server 300 or the SDN controller 400 in response to the HTTP request message and the continuously transmitted HTTP message.

The web server 300 receives information transmitted from the client unit 200 corresponding to a source (alternatively, a departure) through the SDN network 100.

Also, the web server 300 receives an HTTP Request message (alternatively, a Slow HTTP Request message/packet) transmitted from the client unit 200 connected through the SDN network 100 (alternatively, a communication network/network).

Also, the web server 300 transmits a response message (alternatively, an HTTP response message/response signal/ACK signal) to the received HTTP Request message to the client unit 200 transmitting the HTTP Request message.

Further, the web server 300 determines whether the received HTTP Request message could be an incomplete HTTP Request message suspected for the attack. In this case, the web server 300 may determine whether the received HTTP Request message is an incomplete HTTP Request message possibly suspected for the attack (alternatively, an HTTP Request message for the attack). For example, the determination can be made by comparing Copen which is the number of message input connections to the web server 300 with Cth which is the threshold number of the message input connection. Here, an algorithm for determining whether the received HTTP Request message is the incomplete HTTP Request message suspected for the attack may include various developed or known methods in addition to the method of comparing the number of message input connections with the threshold number of the connection.

As the determination result, when the received HTTP Request message is not suspected for the attack, the web server 300 maintains a waiting state for receiving an HTTP message (alternatively, an HTTP continuation message) additionally (alternatively, continuously) transmitted from the client unit 200 in addition to the received HTTP Request message.

Further, as the determination result, when the received HTTP request message is suspected for the attack, the web server 300 transmits to the SDN controller 400 the received HTTP request message (alternatively, an attack-suspected HTTP Request message/Slow HTTP Request message/attack-suspected Slow HTTP Request message).

Further, the web server 300 terminates (alternatively, cancels) a connection (alternatively, a session) with the client unit 200 transmitting the HTTP Request message suspected for the attack when the web server 300 is notified by the SDN controller that the incomplete HTTP Request message suspected for the attack is confirmed as targeting the attack.

Further, the web server 300 transmits an additional HTTP Response message to the client unit 200 in response to the HTTP message subsequent to the received HTTP Request message.

The SDN controller 400 is connected with the client unit 200, the web server 300, and the like through the SDN network 100.

Further, in order to exchange related messages required for defending against a DDoS attack, the SDN controller 400 is connected with the web server 300 by a TCP 3-way handshaking method or the like to perform procedures for requesting, accepting, and providing services.

Further, the SDN controller 400 detects and blocks a DDoS attack in the network by using an SDN characteristic. Herein, the SDN separates a control plane and a data plane of the network device and performs control functions in the logically centralized SDN controller 400.

In addition, the SDN controller 400 manages overall information of the network belonging to a charging area, controls data flow in the data plane, and provides network abstraction to an SDN application.

In addition, the SDN controller 400 performs a function of enhancing efficiency of a network operation using the SDN application while accumulating, managing, and updating the overall knowledge (alternatively, information/data) of the network managed by the SDN controller 400.

Further, the SDN controller 400 (alternatively, an attack identification unit 410) may detect a DDoS attack by using the structure and the characteristic of such an SDN and act against the Slow HTTP DDoS attack by changing a flow routing rule to block the attack data.

As such, the SDN controller 400 collects information of the SDN network 100 to reconfigure a predetermined information transmission path.

Further, the SDN controller 400 may be configured by an attack identification unit 410 for determining if the HTTP Request message (alternatively, the attack-suspected HTTP Request message/Slow HTTP Request message/attack-suspected Slow HTTP Request message) is for an attack. A traffic path controller 420 is for controlling (alternatively, reconfiguring) a traffic path based on the determination result by the attack identification unit 410.

Further, the SDN controller 400 receives the HTTP Request message (alternatively, the attack-suspected HTTP Request message/Slow HTTP Request message/attack-suspected Slow HTTP Request message) transmitted from the web server 300.

Further, the SDN controller 400 transmits to one or more SDN nodes 110 a first traffic path change request message (alternatively, a Route-Change message including information (for example, including destination IP information related with the SDN controller 400, destination port information related with the SDN controller 400, and the like) (alternatively, information for changing a traffic routing rule of the SDN node 110) for changing from the web server 300 to the SDN controller 400 a destination of the HTTP message continuously subsequent to the HTTP Request message transmitted from the client unit 200 to the web server 300 as the destination.

Further, the SDN controller 400 receives the HTTP messages continuously subsequent to the HTTP Request message transmitted from the client unit 200 instead of the web server 300 when the destination of the data flow is changed according to the first traffic path change request message.

Further, the SDN controller 400 transmits an HTTP response message to the HTTP message continuously subsequent to the received HTTP Request message to the client unit 200 instead of the web server 300.

In addition, the SDN controller 400 determines (alternatively, confirms/identifies/judges) if the received incomplete HTTP Request message suspected for the attack (alternatively, the attack-suspected HTTP Request message/Slow HTTP Request message/attack-suspected Slow HTTP Request message) is for an attack. In this case, the SDN controller 400 may determine if the incomplete HTTP Request message suspected for the attack is for an attack using a known method (alternatively, methods) of determining various attacks.

Further, the SDN controller 400 may also confirm if the received incomplete HTTP Request message suspected for the attack and/or the continuously received HTTP message (alternatively, the HTTP Continuation message) is for an attack.

The attack identification unit 410 confirms if an incomplete HTTP Request message suspected for the attack is actually for an attack and also confirms if the incomplete HTTP Request message suspected for the attack and one or more HTTP messages received next to the HTTP Request message are for an attack.

As the confirmation result, when the received incomplete HTTP Request message suspected for the attack is confirmed as the normal HTTP Request message, the SDN controller 400 transmits to one or more SDN nodes 110 a second traffic path change request message (alternatively, a Route-Change message) including information (alternatively, information of changing a traffic routing rule of the SDN node 110) for changing from the SDN controller 400 to the web server 300 a destination of the HTTP message continuously subsequent to the HTTP Request message transmitted from the client unit 200, so that the information transmission path is restored between the client unit 200 and the web server 300 to perform a normal web service.

Further, as the confirmation result, when the received incomplete HTTP Request message suspected for the attack is confirmed as an HTTP Request message (alternatively, a Slow HTTP Request message) for an attack, the SDN controller 400 transmits to one or more SDN nodes 110 a third traffic path change request message including source IP information, destination IP information, source port information, and destination port information (alternatively, information for changing a traffic routing rule of the SDN node 110) of the client unit 200 as the attacker, in order to discard the message (alternatively, packet) transmitted from the client unit 200 toward the web server 300 as the destination.

In the exemplary embodiment of the present invention, only a case where the communication network is based on the SDN is described, but the present invention is not limited thereto. In a communication network (alternatively, a network) using various communication methods, in the case of receiving the message suspected for the attack in the web server 300 through a communication network controller (not illustrated) (for example, including the SDN controller 400 and the like) formed between the client unit 200 and the web server 300, the present invention may also be configured by having a third apparatus located at a network end to receive the message suspected for the attack and transmit a subsequent message to the web server 300 or discard the subsequent message at the network end according to the decision by the third apparatus if the message suspected for the attack is actually for an attack.

As such, when the HTTP Request message suspected for the attack arrives to the web server, the web server sends the HTTP Request message suspected for the attack to the SDN controller located in the network, and the SDN controller may determine if the HTTP Request message suspected for the attack is for an DDoS attack instead of the web server which is an attack target and block traffic from an attacker through a node (alternatively, a router) on the network according to the determination result.

Further, as such, when the HTTP Request message suspected for the attack arrives at the web server, immediately after the SDN controller receives the HTTP Request message from the web server, the SDN controller transmits the traffic path change request messages to the SDN nodes so that the SDN controller receives the HTTP message subsequently transmitted from the client unit instead of the web server, and may restore the traffic path or block the corresponding traffic through the SDN nodes depending on the determination result whether the corresponding HTTP Request message is for the DDoS attack or not.

Hereinafter, a method of defending against a DDoS attack based on an SDN according to the present invention will be described in detail with reference to FIGS. 1 to 3.

Figure 2:
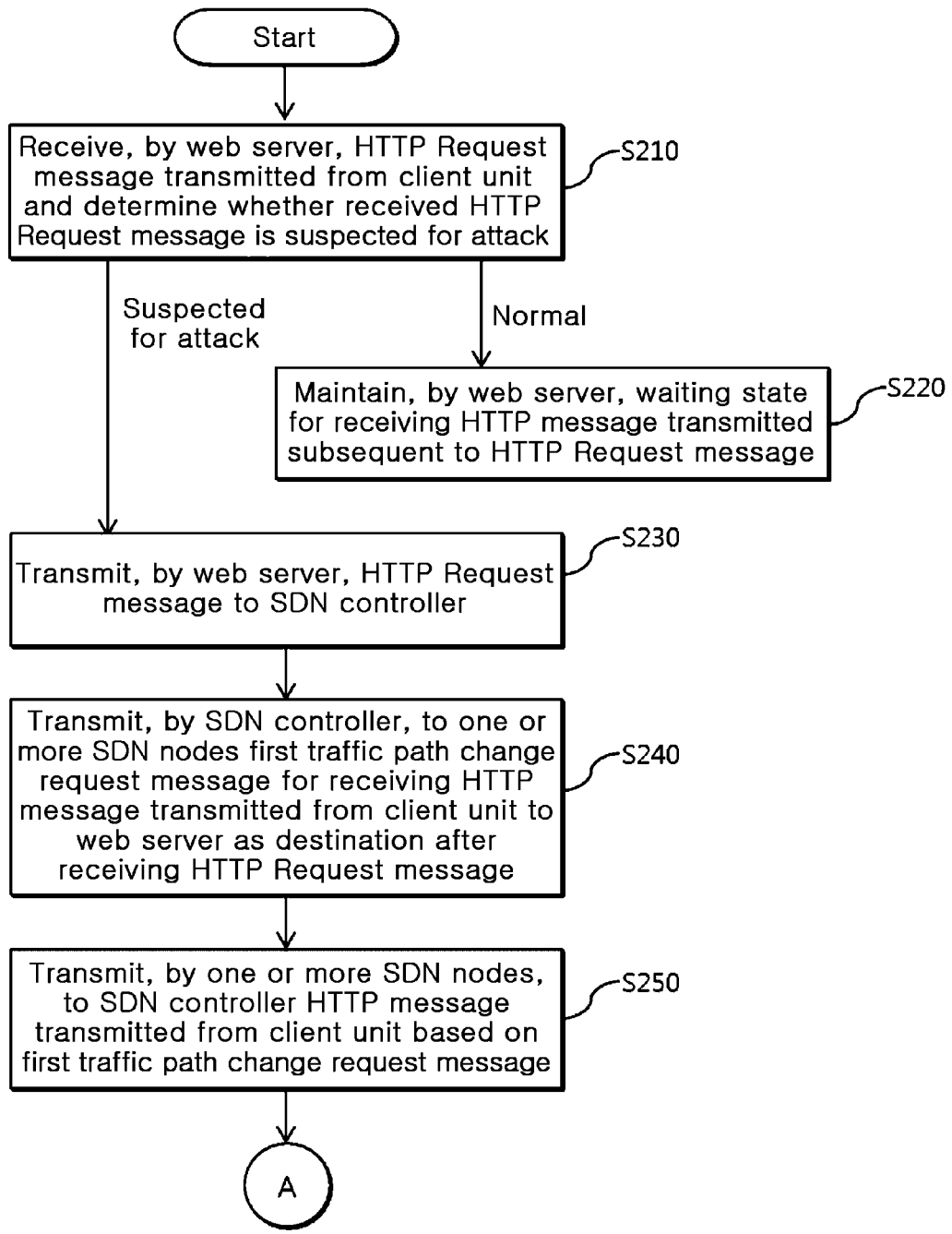
FIGS. 2 and 3 are flowcharts illustrating a method of defending against a DDoS attack based on an SDN according to an exemplary embodiment of the present invention.
Figure 3:
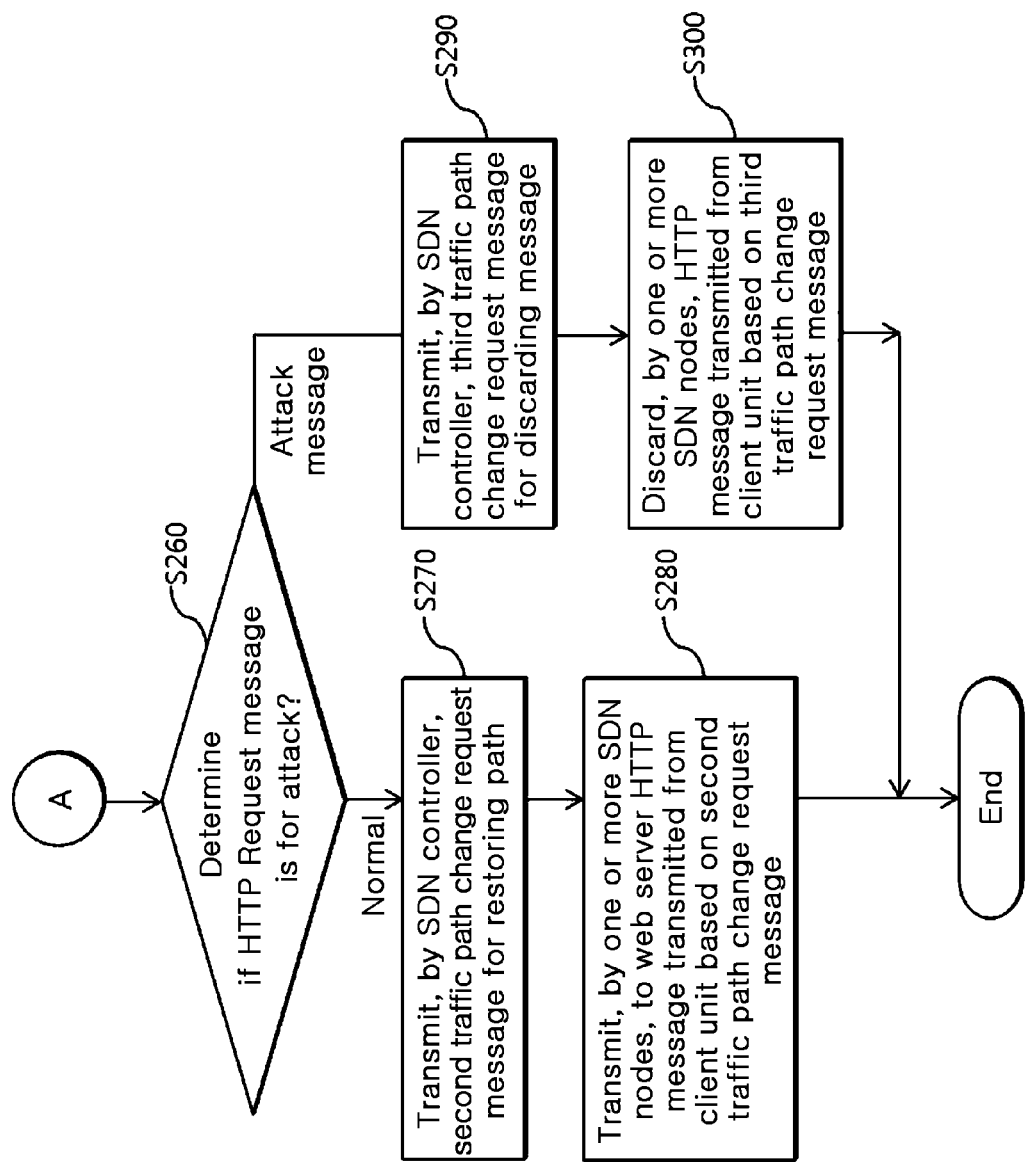

FIGS. 2 and 3 are flowcharts illustrating a method of defending against a DDoS attack based on an SDN according to an exemplary embodiment of the present invention.

First, the web server 300 receives an HTTP Request message (alternatively, a Slow HTTP Request message/packet) transmitted from the client unit 200 connected through the SDN network 100 (alternatively, a communication network/network).

Also, the web server 300 transmits a response message (alternatively, an HTTP response message/response signal/ACK signal) to the received HTTP Request message to the client unit 200 transmitting the HTTP Request message.

Further, the web server 300 determines (alternatively, confirms/identifies) whether the received HTTP Request message is an incomplete HTTP Request message suspected for the attack. In this case, the web server 300 may determine whether the received HTTP Request message is an incomplete HTTP Request message is for the attack (alternatively, an HTTP Request message for the attack). The determination process may be performed by a known method or forthcoming methods. An example of determination can be Copen comparison in which the number of message input connections to the web server 300 is compared with Cth which is the threshold number of the message input connections. Herein, an algorithm for determining whether the received HTTP Request message is the incomplete HTTP Request message suspected for the attack may include various known methods in addition to the method of comparing the number of message input connections with the threshold number of the message input connections.

As an example, the web server 300 receives a first HTTP Request message transmitted from the client unit 200 via one or more SDN nodes 110 included in the SDN network 100.

Further, the web server 300 transmits a first HTTP response message, which is a response message to the received first HTTP Request message, to the client unit 200.

Further, the client unit 200 receives the first HTTP response message transmitted from the web server 300 in response to the first HTTP Request message.

Further, the web server 300 may determine whether the received first HTTP Request message is an incomplete HTTP Request message suspected for the attack by comparing the Copen which is the number of message input connections to the web server 300 with the Cth which is the predetermined threshold number of the message input connections (S210). The web server 300 then halts all the tasks related to the HTTP Request message.

As the determination result, when the received HTTP Request message is not for the attack, the web server 300 stays in a normal operating state for receiving an HTTP message (alternatively, an HTTP continuation message) additionally (alternatively, continuously) transmitted from the client unit 200 in addition to the received HTTP Request message.

As an example, as the determination result, when the Copen which is the number of message input connections to the web server 300 is smaller than the Cth which is the threshold number of the input connections, the web server 300 stays in the normal operating state for receiving the HTTP message (alternatively, the HTTP Continuation message) continuously transmitted from the client unit 200 after the first HTTP Request message (S220). Further, as the determination result, when the received HTTP Request messages are suspected for the attack, the web server 300 sends to the SDN controller 400 the received HTTP Request messages (alternatively, an attack-suspected HTTP Request messages/Slow HTTP Request messages/attack-suspected Slow HTTP Request messages).

Further, the web server 300 halts (alternatively, cancels) all the tasks (alternatively, a session) requested by the client unit 200 transmitting the HTTP Request message suspected for the attack.

As an example, as the determination result, when the Copen which is the number of message input connections to the web server 300 is larger than or equal to the Cth which is the threshold number of the message input connections, the web server 300 sends the received HTTP Request message (alternatively, attack-suspected HTTP Request message) to the SDN controller 400 and halts all the tasks requested by the HTTP Request message from the client unit 200 (alternatively, the web server 300 terminates the connection with the client unit 200 after sending the received HTTP Request message to the SDN controller 400) (S230).

Thereafter, the SDN controller 400 receives the HTTP Request messages (alternatively, the attack-suspected HTTP Request messages/Slow HTTP Request messages/attack-suspected Slow HTTP Request messages) sent from the web server 300.

Further, the SDN controller 400 transmits to one or more SDN nodes 110 a first traffic path change request message (alternatively, a Route-Change message including information (for example, destination IP information related with the SDN controller 400, destination port information related with the SDN controller 400, and the like) (alternatively, information for changing a traffic routing rule of the SDN node 110) for changing from the web server 300 to the SDN controller 400 a destination of the HTTP messages continuously subsequent to the HTTP Request messages transmitted from the client unit 200 to the web server 300 as the destination.

As an example, the SDN controller 400 receives the HTTP Request messages (alternatively, attack-suspected HTTP Request messages) transmitted from the web server 300.

In addition, the SDN controller 400 transmits a first traffic path change request message including information for changing from the web server 300 to the SDN controller 400 a destination of HTTP Continuation messages transmitted from the client unit 200 subsequent to the HTTP Request messages to one or more SDN nodes 110 (alternatively, one or more nodes 110 located between the client unit 220 and the web server 300) included in the SDN network 100 (S240).

Thereafter, one or more of SDN nodes 110 receive the first traffic path change request message transmitted from the SDN controller 400, respectively.

Further, the SDN node 110 transfers (alternatively, transmits) to the SDN controller 400 HTTP messages (alternatively, HTTP Continuation messages) continuously subsequent to the HTTP Request messages transmitted from the client unit 200 to the web server 300 as the destination based on the received first traffic path change request message.

Further, the SDN controller 400 receives the HTTP messages continuously subsequent to the HTTP Request message transmitted from the client unit 200.

Further, the SDN controller 400 transmits HTTP response messages to the HTTP messages continuously subsequent to the received HTTP Request messages to the client unit 200.

As an example, one or more SDN nodes 110 receive the first traffic path change request message transmitted from the SDN controller 400, respectively.

Further, each of the one or more SDN nodes 110 forwards to the SDN controller 400 instead of the web server 300 the HTTP Continuation messages transmitted continuously to the HTTP Request messages from the client unit 200 to the web server 300 as the destination according to the received first traffic path change request message.

Further, the SDN controller 400 receives HTTP Continuation messages transmitted continuously to the HTTP Request messages from the client unit 200 through the one or more SDN nodes 110 which was re-configured by the first traffic path change request message and transmits HTTP response messages to the received HTTP Continuation messages to the client unit 200 S250).

Thereafter, the SDN controller 400 confirms (alternatively, determines/identifies/judges) if the received incomplete HTTP Request messages are for the attack (alternatively, the attack-suspected HTTP Request messages/Slow HTTP Request messages/attack-suspected Slow HTTP Request messages). In this case, the SDN controller 400 may confirm that the incomplete HTTP Request messages are for the attack by using known or forthcoming methods of determining various attacks.

As an example, the SDN controller 400 confirms if the received HTTP Request messages are for an attack (S260).

As the confirmation result, when the received incomplete HTTP Request messages suspected for the attack are confirmed as the normal HTTP Request messages, the SDN controller 400 transmits to one or more SDN nodes 110 a second traffic path change request message (alternatively, a Route-Change message) including information (alternatively, information of changing a traffic routing rule of the SDN node 110) for changing from the SDN controller 400 to the web server 300 a destination of the HTTP messages continuously subsequent to the HTTP Request messages transmitted from the client unit 200, so that the information transmission path is restored between the client unit 200 and the web server 300 to perform a normal web service.

As an example, as the confirmation result, when the received first HTTP Request messages are confirmed as the normal HTTP Request messages, in order to restore the information transmission path between the client unit 200 and the web server 300 to a normal state, the SDN controller 400 transmits a second traffic path change request message including information of changing from the SDN controller 400 to the web server 300 a destination of the Continuation messages transmitted continuously from the client unit 200 subsequent to the HTTP Request messages to one or more SDN nodes 110 included in the SDN network 100 (alternatively, one or more SDN nodes 110 located between the client unit 200 and the web server 300) (S270).

Thereafter, one or more of SDN nodes 110 receive the second traffic path change request message transmitted from the SDN controller 400, respectively.

Further, the SDN node 110 forwards (alternatively, transmits) to the web server 300 instead of the SDN controller 400 HTTP messages continuously subsequent to the HTTP Request messages transmitted from the client unit 200 to the web server 300 as the destination based on the received second traffic path change request message.

Further, the web server 300 receives the HTTP message continuously subsequent to the HTTP Request message transmitted from the client unit 200.

Further, the web server 300 transmits additional HTTP response messages to the client unit 200 in response to the received continuously subsequent HTTP messages.

As an example, one or more of SDN nodes 110 receive the second traffic path change request message transmitted from the SDN controller 400, respectively.

Further, each of the one or more SDN nodes 110 forwards to the web server 300 instead of the SDN controller 400 the HTTP Continuation messages transmitted continuously to the HTTP Request messages from the client unit 200 to the web server 300 as the destination based on the received second traffic path change request message.

Further, after the one or more SDN nodes 110 receives the second traffic path change request message, the web server 300 receives the HTTP Continuation messages transmitted continuously to the HTTP Request messages from the client unit 200 through one or more SDN nodes 110 (S280).

Further, as the confirmation result, when the received incomplete HTTP Request messages suspected for the attack are confirmed as HTTP Request messages (alternatively, a Slow HTTP Request messages) targeting an attack, the SDN controller 400 transmits to the one or more SDN nodes 110 a third traffic path change request message including source IP information, destination IP information, source port information, and destination port information (alternatively, information for changing a traffic routing rule of the SDN node 110) of the client unit 200 as the attacker, in order to discard the messages (alternatively, packet) transmitted from the client unit 200 as the attacker to the web server 300 as the destination.

As an example, as the confirmation result, when the received HTTP Request messages are confirmed as the HTTP Request messages for the attack, the SDN controller 400 transmits a third traffic path change request message including source IP information, destination IP information, source port information, destination port information, and the like of the client unit 200 as the attacker to one or more SDN nodes 110 (alternatively, one or more SDN nodes 110 located between the client unit 200 and the web server 300), in order to discard the HTTP Continuation messages transmitted from the client unit 200 as the attacker to the web server 300 as the destination (S290).

Thereafter, one or more of SDN nodes 110 receive the third traffic path change request message transmitted from the SDN controller 400, respectively.

Further, the SDN node 110 does not forward to the SDN controller 400 and the web server 300 HTTP messages (alternatively, HTTP request messages for attack/Slow HTTP Request messages for attack) continuously subsequent to the HTTP Request messages transmitted from the client unit 200 to the destination based on the received third traffic path change request message, but discards (alternatively, deletes) the HTTP messages.

As an example, one or more of SDN nodes 110 receive the third traffic path change request message transmitted from the SDN controller 400, respectively.

Further, at least one SDN node 110 among one or more SDN nodes 110 discards the HTTP Continuation messages transmitted continuously to the HTTP Request messages from the client unit 200 to the web server as the destination based on the received third traffic path change request message (S300).

In the exemplary embodiment of the present invention, as described above, when the HTTP Request messages suspected for the attack arrive at the web server, the web server sends the HTTP Request messages suspected for the attack to the SDN controller located in the network, and the SDN controller determines the DDoS attack instead of the web server which is the attack target and blocks the traffic from the attacker through the node (alternatively, router) on the network according to the determination result to input the traffic suspected as the DDoS attack that exhausts available connection resources of the web server by transmitting the incomplete HTTP messages, thereby protecting the web server from the DDoS attack and securing the maintenance of the normal operation of the web server.

Further, in the exemplary embodiment of the present invention, as described above, when the HTTP Request messages suspected for the attack arrive to the web server, immediately after the SDN controller receives the HTTP Request messages from the web server, the SDN controller transmits the traffic path change request messages to the SDN nodes to receive the HTTP message continuously transmitted from the client unit instead of the web server and restores the traffic path or blocks the corresponding traffic through the SDN nodes according to the result of determining if the corresponding HTTP Request messages are for an attack to block the traffic from the detected DDoS attacker from the network device before arriving at the web server, thereby preventing the delivery of the traffic so that the waste of an occupied bandwidth in the network path can be avoided.

Hereinabove, although the present invention is described by specific matters such as concrete components, and the like, embodiments, and drawings, they are provided only for assisting in the entire understanding of the present invention. Therefore, the present invention is not limited to the embodiments. Therefore, the embodiments disclosed in the present invention are used to not limit but describe the technical spirit of the present invention and the scope of the technical spirit of the present invention is not limited by the embodiments. The scope of the present invention should be interpreted by the appended claims and all technical spirit in the equivalent range thereto should be interpreted to be embraced by the claims of the present invention.

According to the present invention, when the HTTP Request messages suspected for the attack arrives at the web server, the web server sends the HTTP Request messages suspected for the attack to the SDN controller located in the network, and the SDN controller determines the DDoS attack instead of the web server which is the attack target and blocks the traffic suspected as the DDoS attack that exhausts available connection resources of the web server by transmitting the incomplete HTTP message from the attacker through the nodes (alternatively, routers) on the network according to the determination result, thereby protecting the web server from the DDoS attack and securing the maintenance of the normal operation of the web server. Therefore, the present invention can be widely used in a DDoS attack defense field, a network management field, a distributed server field, and the like.

What is claimed is:

1. A method of defending against a Distributed Denial of Service (DDoS) attack based on a Software-Defined Networking (SDN), the method comprising:
sending, by a web server, an incomplete HTTP Request message transmitted from a client unit to an SDN controller;
transmitting, by the SDN controller, a traffic path change request message to one or more SDN nodes, the traffic path change request message including information for changing a destination of the incomplete HTTP Request message and a destination of a subsequent HTTP message from the webserver to the SDN controller, wherein the subsequent HTTP message is subsequent to the incomplete HTTP Request message and transmitted from the client unit;
determining, by the SDN controller, whether the incomplete HTTP Request message transmitted from the client unit is for an attack on the web server;
when the incomplete HTTP Request message is determined as a normal HTTP Request message, transmitting, by the SDN controller, a restore request message to the one or more SDN nodes, the restore request message including information for changing the destination of the incomplete HTTP Request message and the destination of the subsequent HTTP message from the SDN controller to the web server, in order to restore an information transmission path between the client unit and the web server;
when the incomplete HTTP Request message is determined as a message for the attack on the web server, transmitting, by the SDN controller, a discard request message to the one or more SDN nodes, the discard request message including a request for discarding at the one or more SDN nodes the incomplete HTTP Request message and the subsequent HTTP message; and
discarding, by the one or more SDN nodes, the incomplete HTTP Request message and the subsequent HTTP message based on the discard request message.

2. The method of claim 1, further comprising:
forwarding, by the one or more SDN nodes, to the web server the incomplete HTTP Request message and the subsequent HTTP message based on the restore request message;
receiving, by the web server, the incomplete HTTP message and the subsequent HTTP message.

3. The method of claim 1, wherein the discard request message includes at least one of source IP information, destination IP information, source port information, and destination port information of the client unit.

4. A system of defending against a Distributed Denial of Service (DDoS) attack based on a Software-Defined Networking (SDN), the system comprising:
an SDN network;
a web server configured to send an incomplete HTTP Request message to an SDN controller, the incomplete HTTP Request message transmitted from a client unit;
the SDN controller configured to
transmit to one or more SDN nodes a traffic path change request message, the traffic path change request message including information for changing a destination of the incomplete HTTP Request message and a destination of a subsequent HTTP message from the web server to the SDN controller, wherein the subsequent HTTP message is subsequent to the incomplete HTTP Request message and transmitted from the client unit,
determine whether the incomplete HTTP Request message transmitted from the client unit is for an attack on the web server,
transmit, when the incomplete HTTP Request message is determined as a normal HTTP Request message, to the one or more SDN nodes a restore request message to the one or more SDN nodes, the restore request message including information for changing the destination of the incomplete HTTP Request message and the destination of the subsequent HTTP message from the SDN controller to the web server, in order to restore an information transmission path between the client unit and the web server, and
transmit, when the incomplete HTTP Request message is determined as a message for the attack on the web server, a discard request message to the one or more SDN nodes, the discard request message including a request for discarding the incomplete HTTP Request message and the subsequent HTTP message; and
the one or more SDN nodes configured to
send, to the SDN controller, the incomplete HTTP Request message and the subsequent HTTP message based on the traffic path change request message, and
discard or block the incomplete HTTP Request message and the subsequent HTTP message based on the discard request message.

5. The system of claim 4, wherein the web server is configured to halt all tasks requested by the client unit or terminate the connection with the client unit, after sending to the SDN controller the incomplete HTTP Request message.

6. The system of claim 4, wherein
the SDN controller is configured to
receive the incomplete HTTP Request message and the subsequent HTTP message, and
transmit, to the client unit, an HTTP response message to the incomplete HTTP Request message and the subsequent HTTP message to the client unit.

7. The system of claim 4, wherein
the one or more SDN nodes are configured to forward to the web server the incomplete HTTP Request message and the subsequent HTTP message based on the restore request message, and
the web server is configured to receive the incomplete HTTP Request message and the subsequent HTTP message continuously subsequent to the HTTP Request message transmitted from the client unit through the restored path and transmit an HTTP response message to the incomplete HTTP Request message and the subsequent HTTP message.

* * * * *